(12) United States Patent
Jones et al.

(10) Patent No.: US 12,507,624 B2
(45) Date of Patent: Dec. 30, 2025

(54) ADJUSTABLE MACHINE HANDLE ASSEMBLY AND MOWER

(71) Applicant: KUBOTA CORPORATION, Osaka (JP)

(72) Inventors: Noah Franklin Jones, Gainesville, GA (US); Min Sung Kim, Gainesville, GA (US)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/986,652

(22) Filed: Dec. 18, 2024

(65) Prior Publication Data

US 2025/0311669 A1 Oct. 9, 2025

Related U.S. Application Data

(60) Provisional application No. 63/574,936, filed on Apr. 5, 2024.

(51) Int. Cl.
*A01D 34/00* (2006.01)
*A01D 34/82* (2006.01)

(52) U.S. Cl.
CPC .................. *A01D 34/824* (2013.01)

(58) Field of Classification Search
CPC ... A01D 34/824; A01D 2101/00; B25F 5/026; B62D 1/12; G05G 1/06; G05G 2700/02
See application file for complete search history.

(56) References Cited

U.S. PATENT DOCUMENTS

| 6,098,492 | A | * | 8/2000 | Juchniewicz | ............. | B62B 9/20 |
| | | | | | | 74/555 |
| 7,458,432 | B2 | | 12/2008 | Mayer et al. | | |
| 8,087,481 | B2 | | 1/2012 | Trefz et al. | | |
| 10,321,627 | B1 | | 6/2019 | Lapp | | |
| 2005/0227824 | A1 | * | 10/2005 | Wu | ..................... | A63B 22/0664 |
| | | | | | | 482/52 |
| 2014/0112702 | A1 | * | 4/2014 | Mighells | ................. | F16C 11/10 |
| | | | | | | 403/92 |

FOREIGN PATENT DOCUMENTS

| WO | WO 2023/028453 | 3/2023 | | |
| WO | WO-2023028453 A1 | * | 3/2023 | ............... G05G 1/06 |
| WO | WO 2023/215714 | 11/2023 | | |
| WO | WO-2023215714 A1 | * | 11/2023 | ............. A01D 34/66 |

* cited by examiner

*Primary Examiner* — Zakaria Elahmadi
(74) *Attorney, Agent, or Firm* — MORI & WARD, LLP

(57) ABSTRACT

An adjustable machine handle assembly includes a handle, a support brace configured to support the handle and including a first engagement portion provided on a second side. A handle mounting assembly includes a handle holder configured to hold the handle and an engagement member including a second engagement portion provided on a third side to be engageable with the first engagement portion at positions aligned in a longitudinal direction and a first positive clutch provided on a fourth side. The handle holder includes a second positive clutch provided opposite to the first positive clutch in a side direction and configured to engage with the first positive clutch. A clamp is configured to adjust a distance between the first side of the support brace and a sixth side of the handle holder in the side direction.

20 Claims, 19 Drawing Sheets

ADJUSTABLE MACHINE HANDLE ASSEMBLY AND MOWER

CROSS-REFERENCE TO RELATED APPLICATIONS

The present application claims priority under 35 U.S.C. § 119(e) to U.S. Provisional Patent Application No. 63/574,936, filed Apr. 5, 2024. The contents of this application are incorporated herein by reference in their entirety.

BACKGROUND OF THE INVENTION

Field of the Invention

The present invention relates to an adjustable machine handle assembly and a mower.

Discussion of the Background

WO 2023/028453A1, WO 2023/215714A1, U.S. Pat. Nos. 7,458,432B2, 8,087,481, and 10,321,627B1 each describe an adjustable machine handle assembly which is a control lever of the mower.

An objective of a technology disclosed in the present application is to provide an adjustable machine handle assembly including a handle and a support brace and configured to allow tool-less rotational and translational adjustment of the control levers.

SUMMARY OF THE INVENTION

In accordance with one aspect of the present invention, an adjustable machine handle assembly includes a handle, a support brace, a handle mounting assembly, and a clamp. The support brace is configured to support the handle and has a first side and a second side opposite to the first side in a side direction. The support brace includes a first engagement portion provided on the second side. The handle mounting assembly includes an engagement member and a handle holder. The engagement member has a third side opposite to the second side in the side direction and a fourth side opposite to the third side in the side direction. The engagement member includes a second engagement portion and a first positive clutch. The second engagement portion is provided on the third side to be engageable with the first engagement portion at positions aligned in a longitudinal direction substantially perpendicular to the side direction. The first positive clutch is provided on the fourth side. The handle holder is configured to hold the handle and has a fifth side opposite to the fourth side in the side direction and a sixth side opposite to the fifth side in the side direction. The handle holder includes a second positive clutch provided on the fifth side opposite to the first positive clutch in the side direction and configured to engage with the first positive clutch. The clamp is configured to adjust a distance between the first side of the support brace and the sixth side of the handle holder in the side direction. The clamp is configured to be tightened to fasten the handle holder to the support brace such that the first engagement portion is engaged with the second engagement portion and the first positive clutch is engaged with the second positive clutch to secure a position and an orientation of the handle relative to the support brace. The clamp is configured to be loosened to allow the engagement member to be separated from at least one of the support brace and the handle holder. The second positive clutch is disengaged from the first positive clutch to allow the orientation of the handle relative to the support brace to be changed when the engagement member is separated from the handle holder. The second engagement portion is disengaged from the first engagement portion in the lateral direction to allow the position of the handle relative to the support brace to be changed in the longitudinal direction when the engagement member is separated from the support brace.

In accordance with another aspect of the present disclosure, a mower includes the adjustable machine handle assembly according to the one aspect.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings.

DESCRIPTION OF THE EMBODIMENTS

Structure

Figure 1:
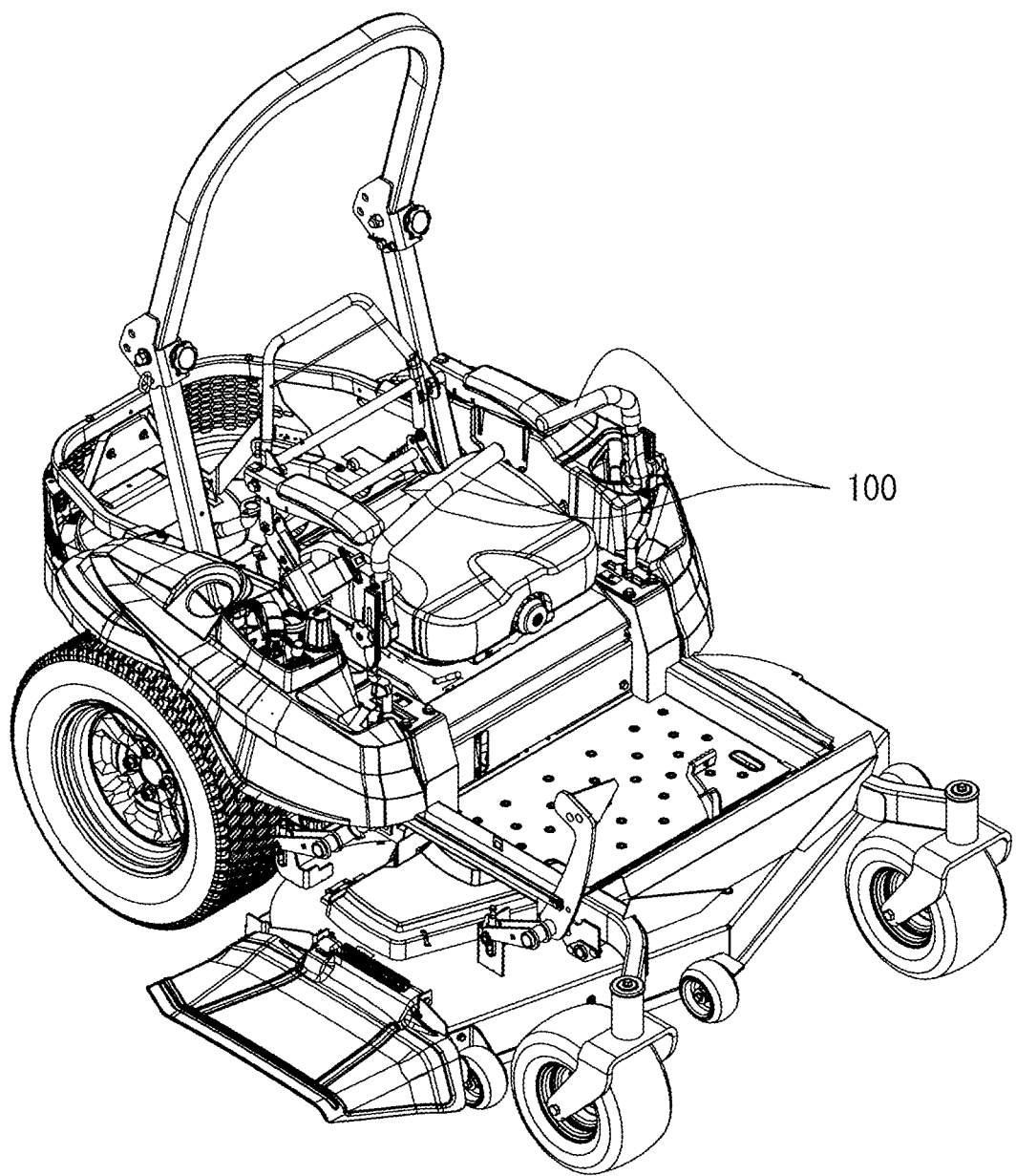
FIG. 1 shows a perspective view of the mower.
Figure 2:
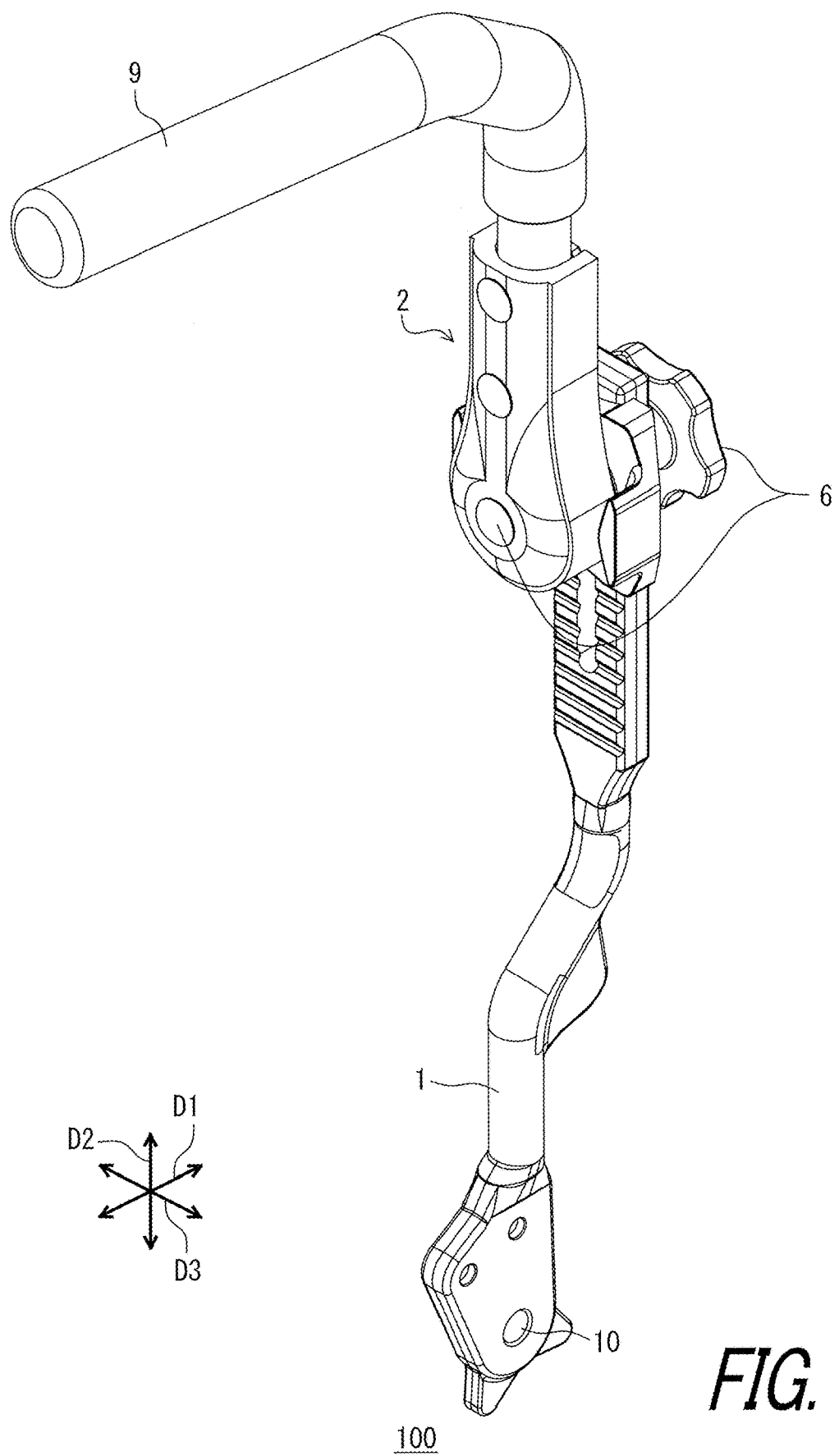
FIG. 2 shows a perspective view of the adjustable machine handle assembly.

As shown in FIG. 1, the adjustable machine handle assembly 100 is a control lever of the mower 200. Especially, as shown in FIG. 2, the adjustable machine handle assembly 100 includes a handle 9, a support brace 1, a handle mounting assembly 2, and a clamp 6. The handle 9 is configured to be operated by the user.

Figure 3:
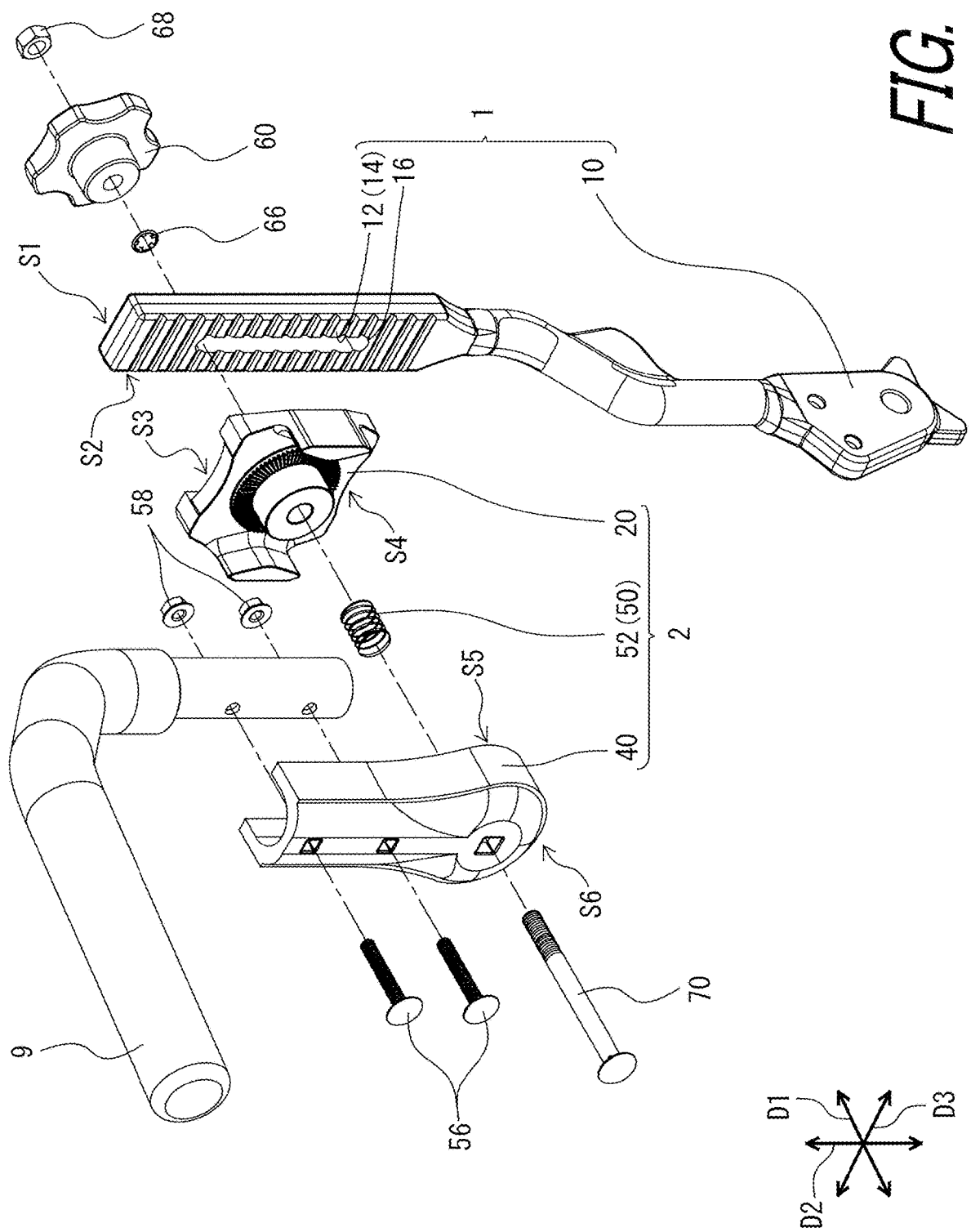
FIG. 3 shows an exploded perspective view of the adjustable machine handle assembly.
Figure 4:
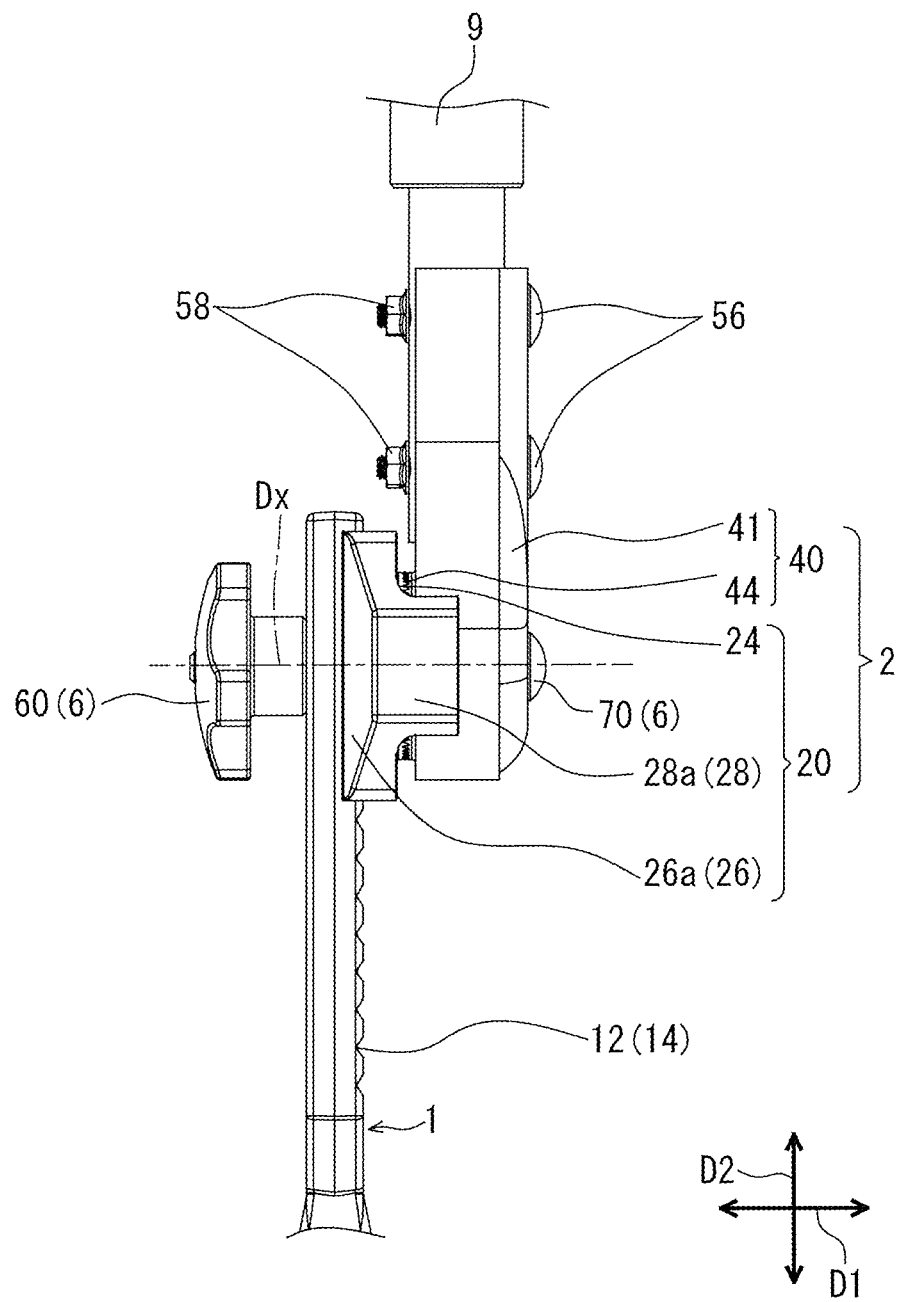
FIG. 4 shows a left side enlarged view of the adjustable machine handle assembly.
Figure 5:
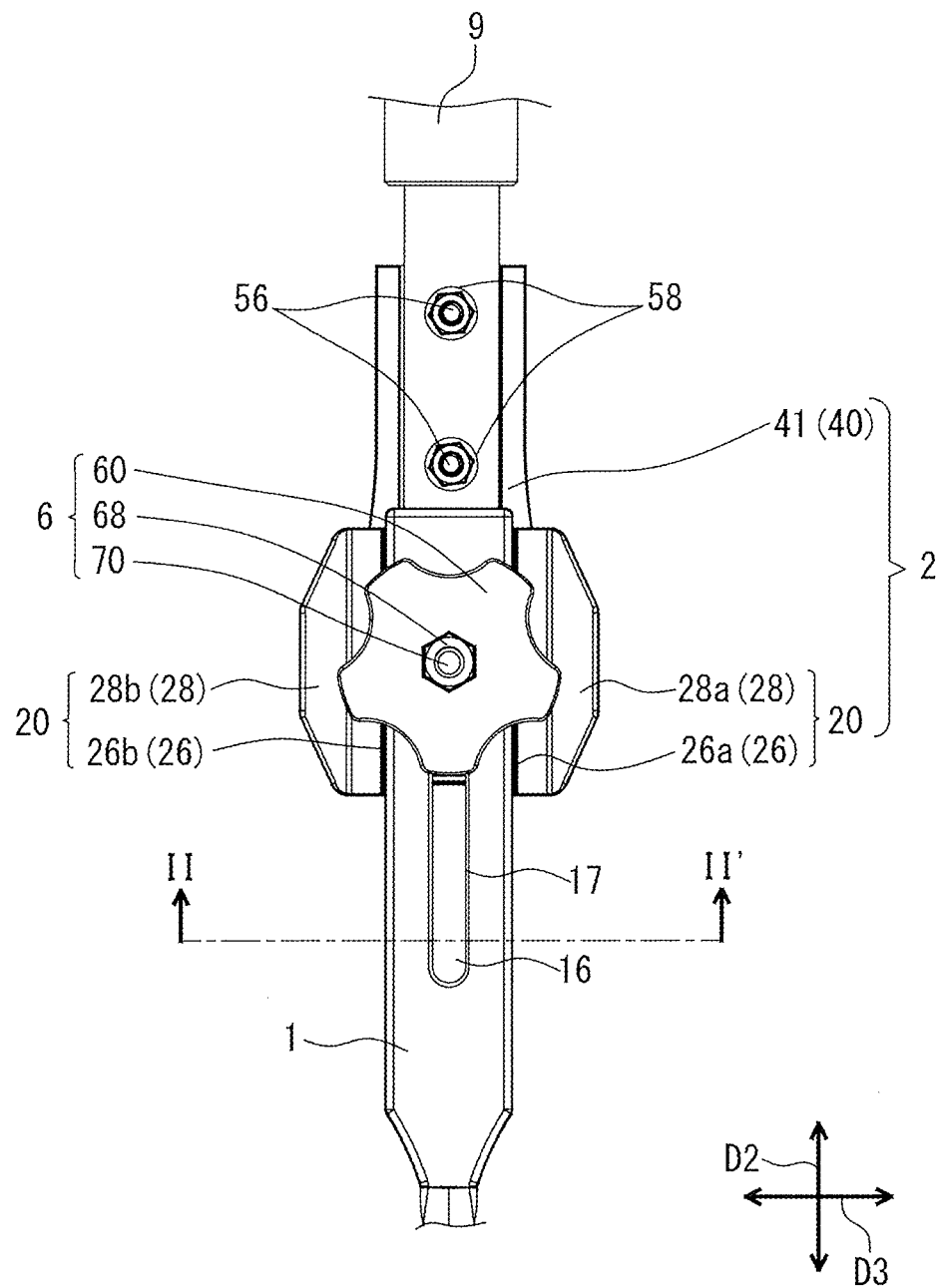
FIG. 5 shows a front enlarged view of the adjustable machine handle assembly.

The support brace 1 includes an attachment portion 10 which is attached to the mower 200. As shown in FIG. 3, the support brace 1 is configured to support the handle 9 and has a first side S1 and a second side S2 opposite to the first side S1 in a side direction D1.

Engagement Structure

The support brace 1 includes a first engagement portion 12 provided on the second side S2. The first engagement portion 12 includes grooves 14 provided on the second side S2 of the support brace 1 and aligned in a longitudinal direction D2 substantially perpendicular to the side direction D1. Preferably, each of the grooves 14 extends in the lateral direction D3 substantially perpendicular to the longitudinal direction D2 and the side direction D1, however each of the grooves 14 may extend in a different direction from the lateral direction D3, which is non-parallel to the longitudinal direction D2 and substantially perpendicular to the side direction D1.

Figure 8:
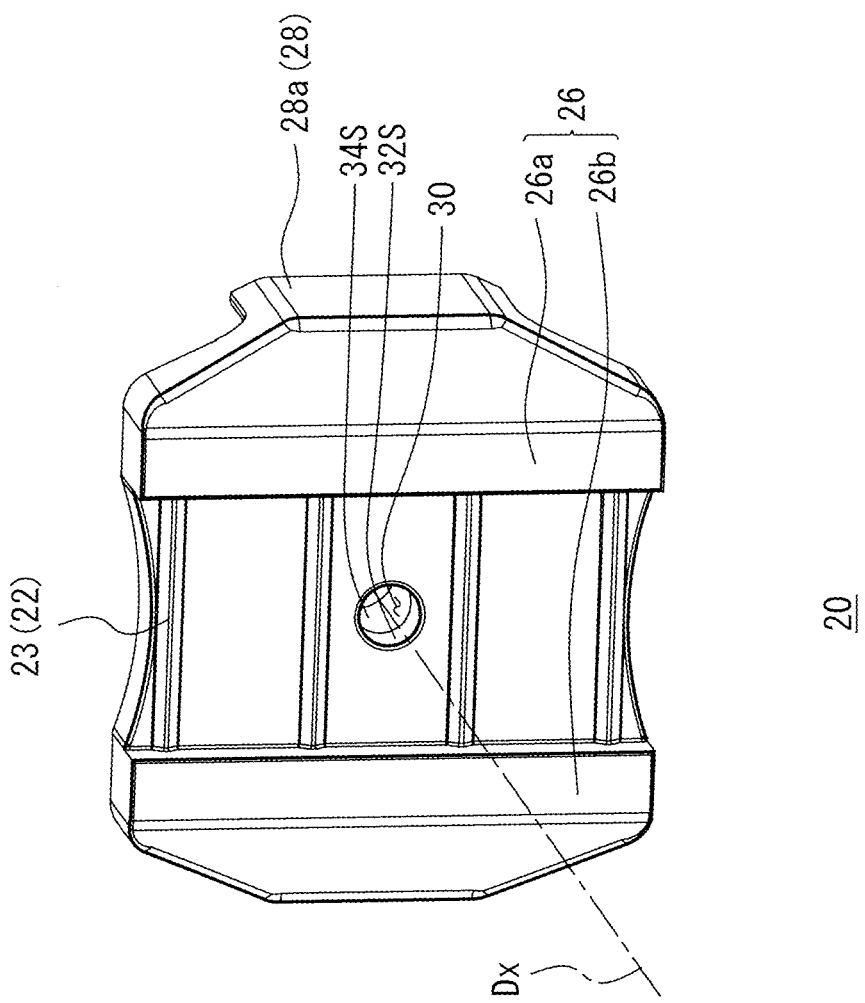
FIG. 8 shows a front perspective view of the engagement member.
Figure 12:
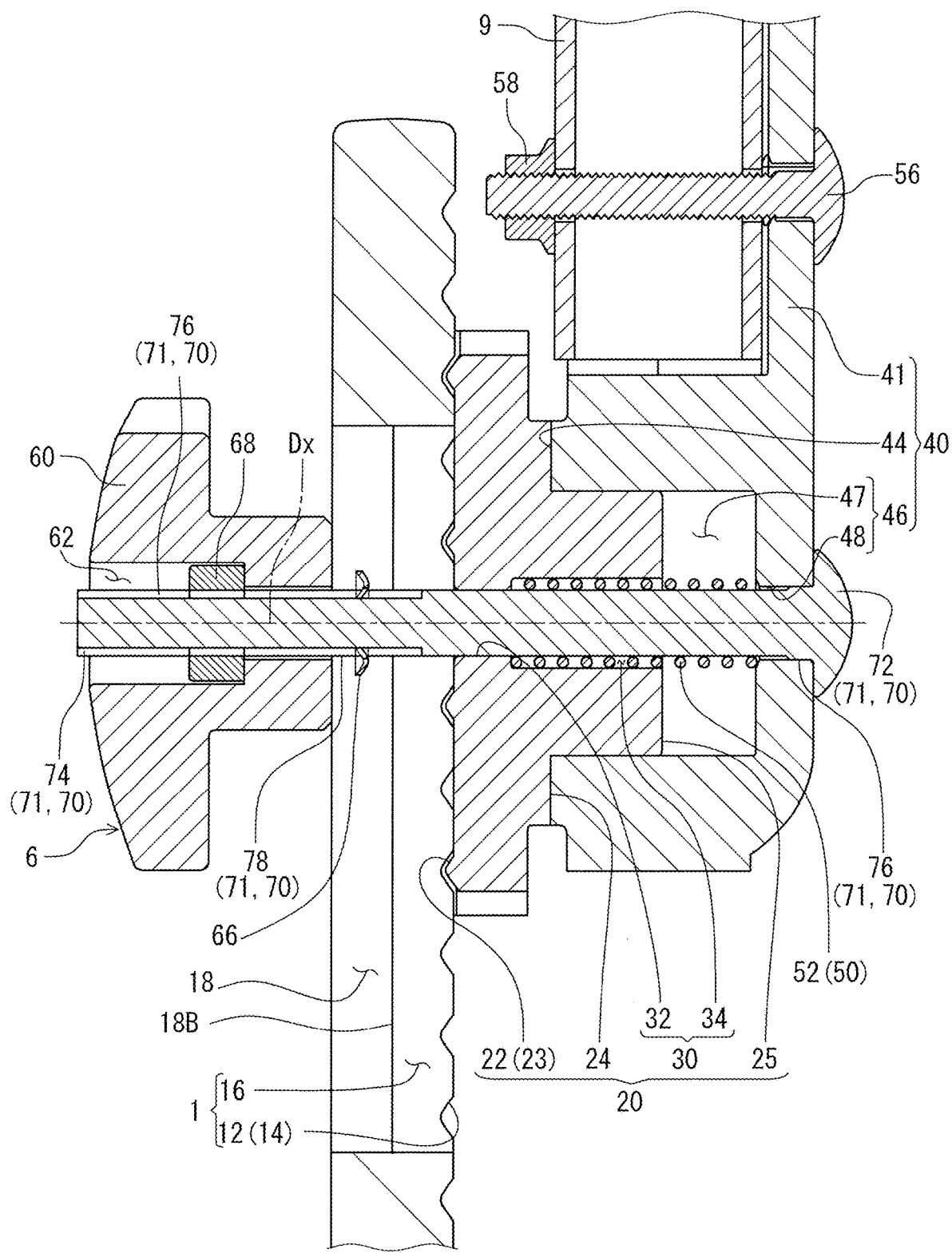
FIG. 12 shows a cross-sectional view taken along the cross-sectional line I-I' of FIG. 6.
Figure 18:
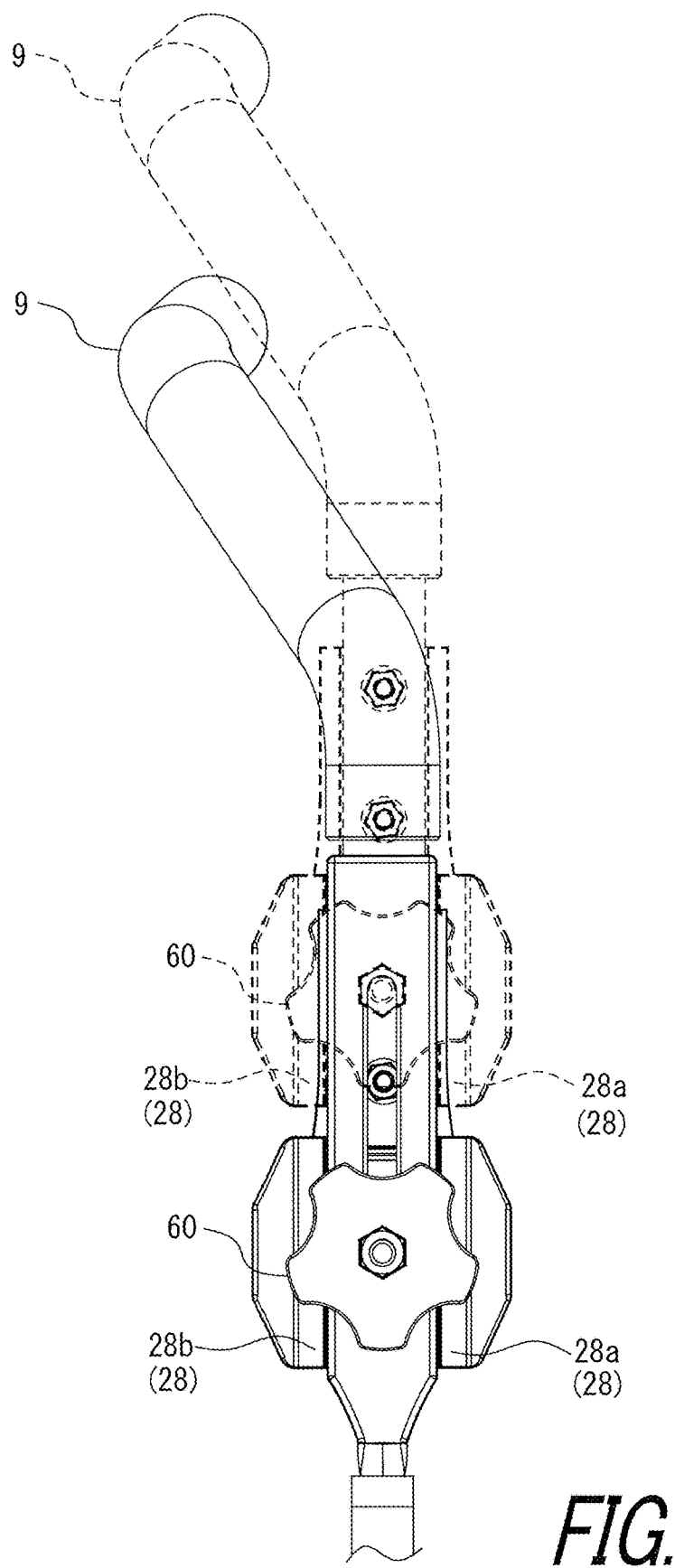
FIG. 18 shows various positions of handle relative to the support brace wherein the solid line shows the handle standing at the lowest position of the slot; and the dotted line shows the handle standing at the highest position of the slot.
Figure 19:
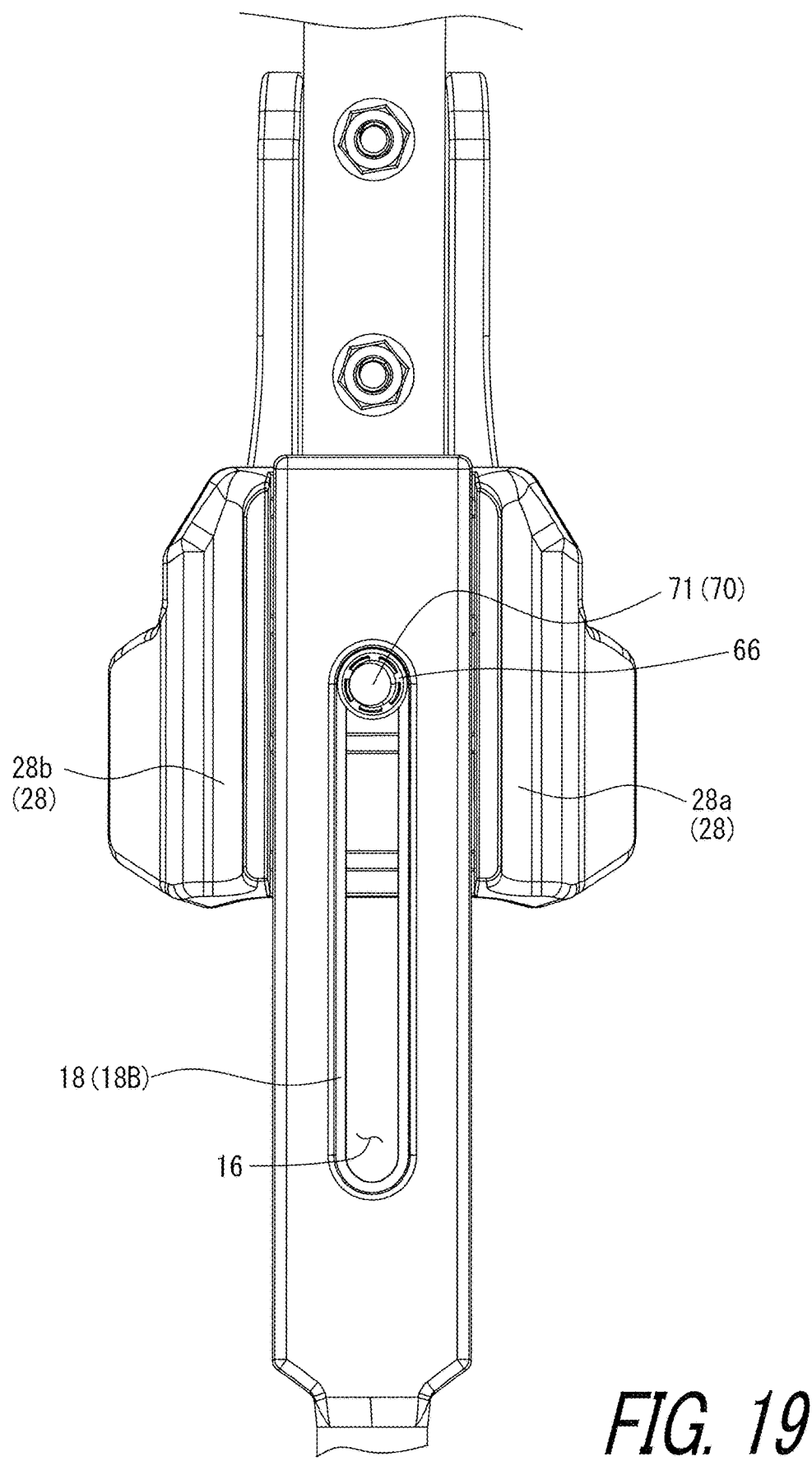
FIG. 19 shows a front enlarged view of the adjustable machine handle assembly wherein the knob is removed from the adjustable machine handle assembly and the handle stands at the highest position of the slot.

The handle mounting assembly 2 includes an engagement member 20 having a third side S3 opposite to the second side S2 in the side direction D1 and a fourth side S4 opposite to the third side S3 in the side direction D1. As shown in FIGS. 3, 8, and 12, the engagement member 20 includes a second engagement portion 22 provided on the third side S3. The second engagement portion 22 includes at least one tooth 23 provided on the third side S3 of the engagement member 20 to be engageable with the grooves 14. Preferably, each of the at least one tooth 23 extends in the lateral direction D3, however each of the at least one tooth 23 may extend in a different direction from the lateral direction D3, which is non-parallel to the longitudinal direction D2 and substantially perpendicular to the side direction D1. Preferably, the grooves 14 and the at least one tooth 23 constitute V-groove channels. As shown in FIGS. 12 and 18, the second engagement portion 22 is configured to be engageable with the first engagement portion 12 at positions (heights) aligned in the longitudinal direction D2. The first engagement portion 12 and the second engagement portion 22 are engaged to lock translation in the longitudinal direction D2.

The first engagement portion 12 and the second engagement portion 22 could have a different structure from a structure shown in FIGS. 1-18, which allows translational adjustment of the handle 9.

Figure 9:
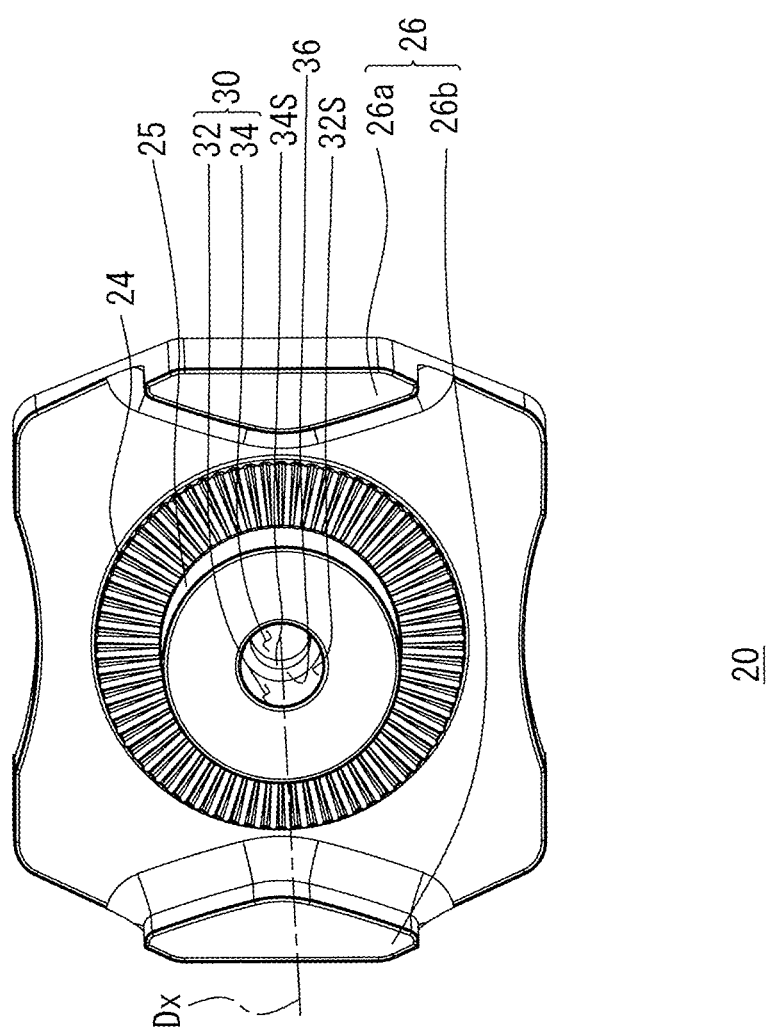
FIG. 9 shows a rear perspective view of the engagement member.
Figure 10:
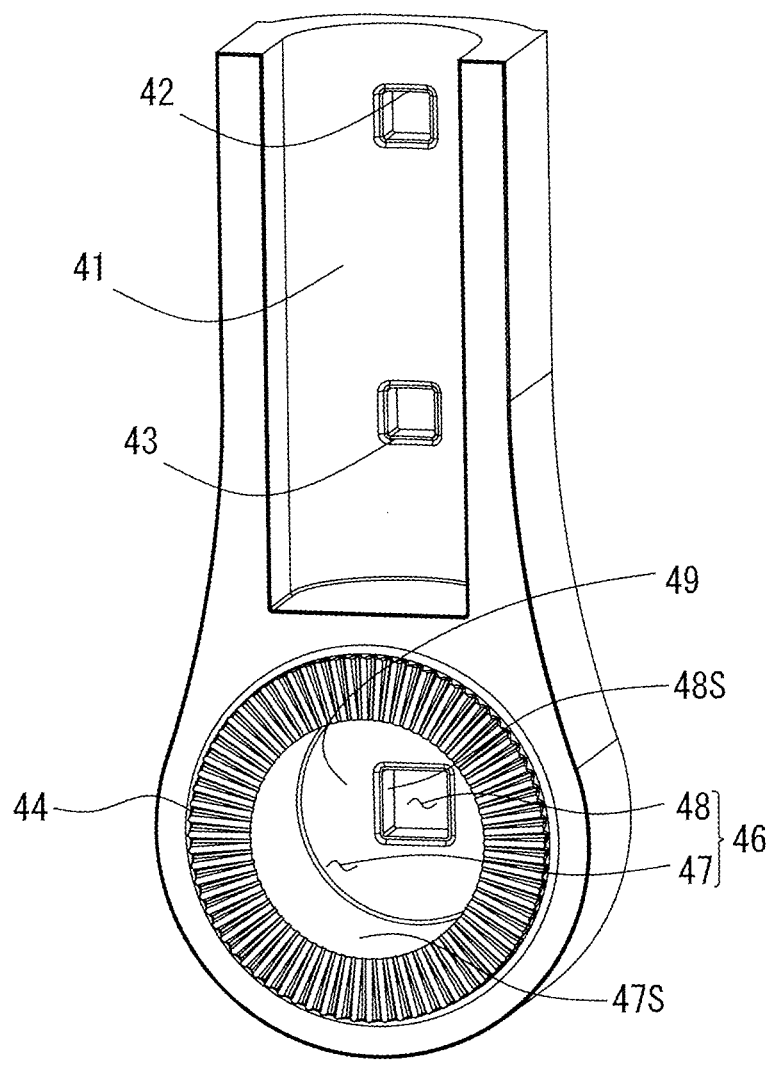
FIG. 10 shows a front perspective view of the handle holder.

As shown in FIGS. 3, 9, and 12, the engagement member 20 includes a first positive clutch 24 provided on the fourth side S4. As shown in FIGS. 3, 10, and 12, the handle holder 40 is configured to hold the handle 9 and having a fifth side S5 opposite to the fourth side S4 in the side direction D1 and a sixth side S6 opposite to the fifth side S5 in the side direction D1. The handle holder 40 includes a handle mounting portion 41 having attachment holes 42, 43 through which attachment bolts 56 are inserted. The attachment bolts 56 can be carriage bolts having square necks. The handle 9 is fastened to the handle holder 40 by the attachment bolts 56 and the attachment nuts 58. The attachment nuts 58 are, for example, nylon flange lock nuts to lock the attachment bolts 56 into place and to prevent loosening from vibration.

The handle holder 40 includes a second positive clutch 44 provided on the fifth side S5 opposite to the first positive clutch 24 in the side direction D1 and configured to engage with the first positive clutch 24.

The first positive clutch 24 and the second positive clutch 44 constitute, for example, a Hirth joint whose teeth extend in a radial direction with respect to the central axis Dx. That is, the first positive clutch 24 and the second positive clutch 44 have V-groove clutch teeth.

The clamp 6 is configured to adjust a distance between the first side S1 of the support brace 1 and the sixth side S6 of the handle holder 40 in the side direction D1. The clamp 6 is configured to be tightened to fasten the handle holder 40 to the support brace 1 such that the first engagement portion 12 is engaged with the second engagement portion 22 and the first positive clutch 24 is engaged with the second positive clutch 44 to secure a position and an orientation of the handle 9 relative to the support brace 1.

The clamp 6 is configured to be loosened to allow the engagement member 20 to be separated from at least one of the support brace 1 and the handle holder 40. The second positive clutch 44 is disengaged from the first positive clutch 24 to allow the orientation of the handle 9 relative to the support brace 1 to be changed when the engagement member 20 is separated from the handle holder 40. The second engagement portion 22 is disengaged from the first engagement portion 12 in the lateral direction D3 to allow the position of the handle 9 relative to the support brace 1 to be changed in the longitudinal direction D2 when the engagement member 20 is separated from the support brace 1.

Figure 13:
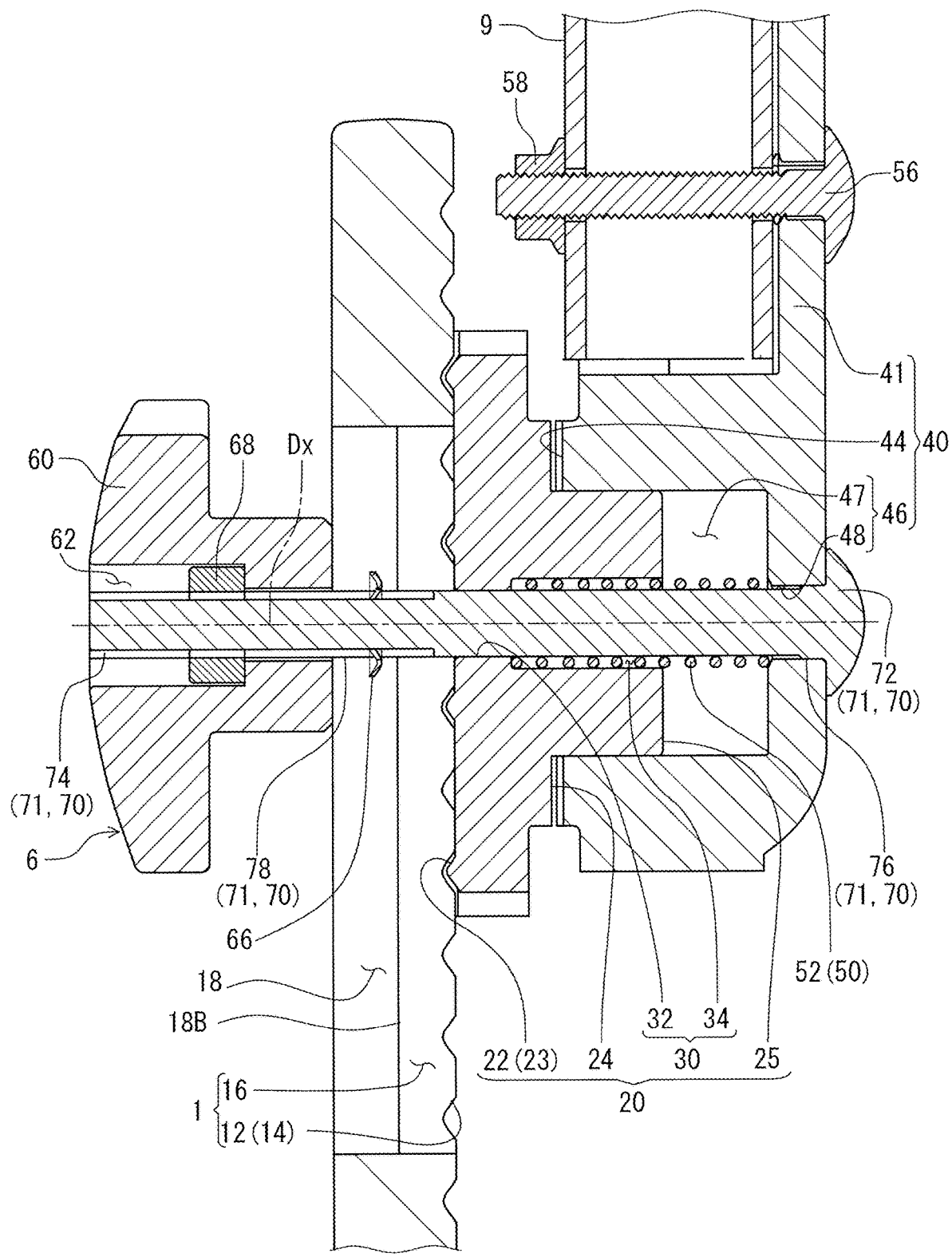
FIG. 13 shows a cross-sectional view taken along the cross-sectional line I-I' of FIG. 6 when the clamp is loosened.
Figure 14:
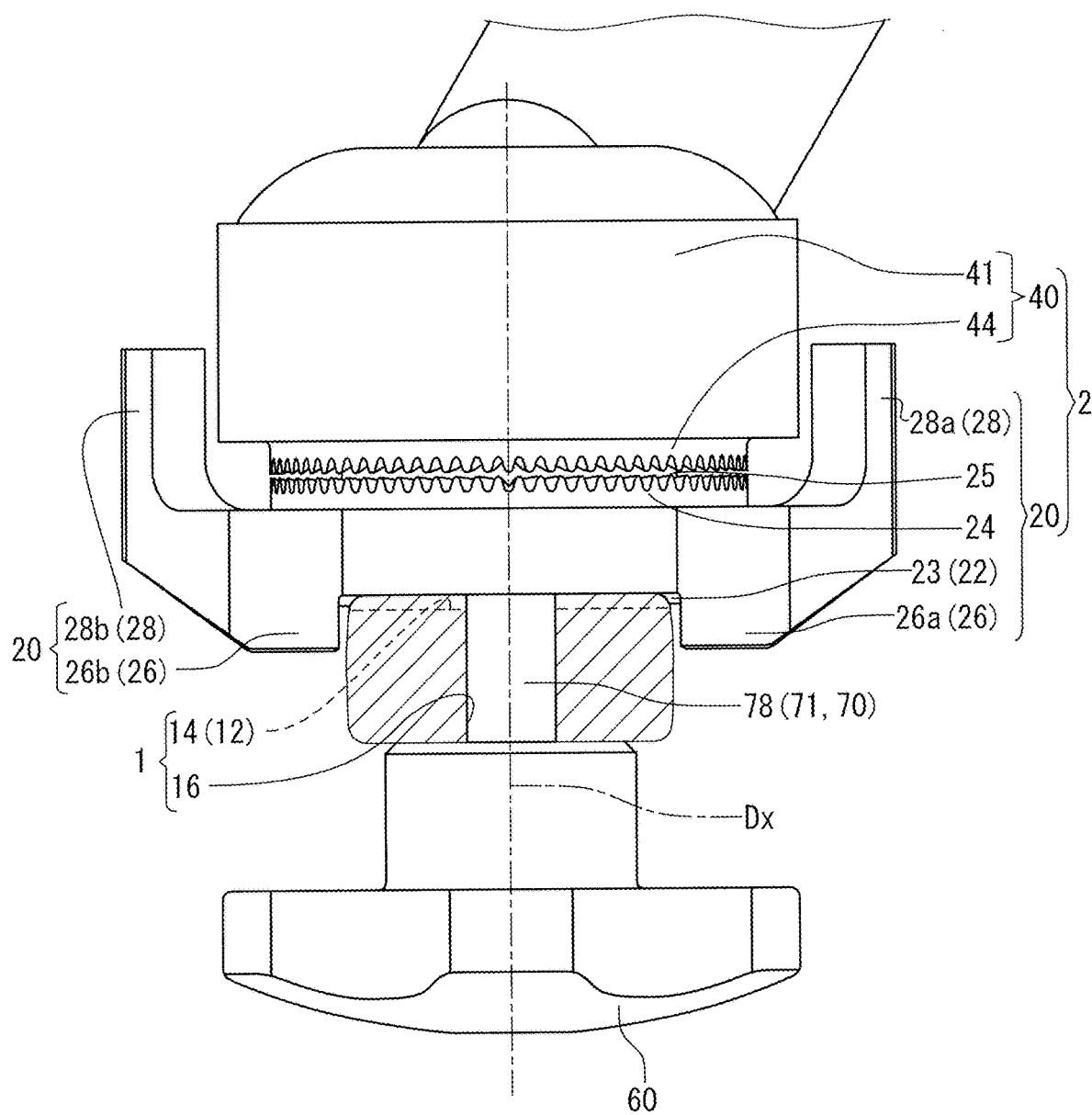
FIG. 14 shows a cross-sectional view taken along the cross-sectional line II-II' of FIG. 5 when the clamp is loosened.

As shown in FIGS. 3, 13, and 14, the handle mounting assembly 2 further includes a pressing member 50 provided between the engagement member 20 and the handle holder 40 in the side direction D1 to push the engagement member 20 against the support brace 1 to engage the second engagement portion 22 with the first engagement portion 12 and to disengage the first positive clutch 24 from the second positive clutch 44 when the clamp 6 is loosened. The pressing member 50 includes a compression spring 52.

Guide Structure

Figure 6:
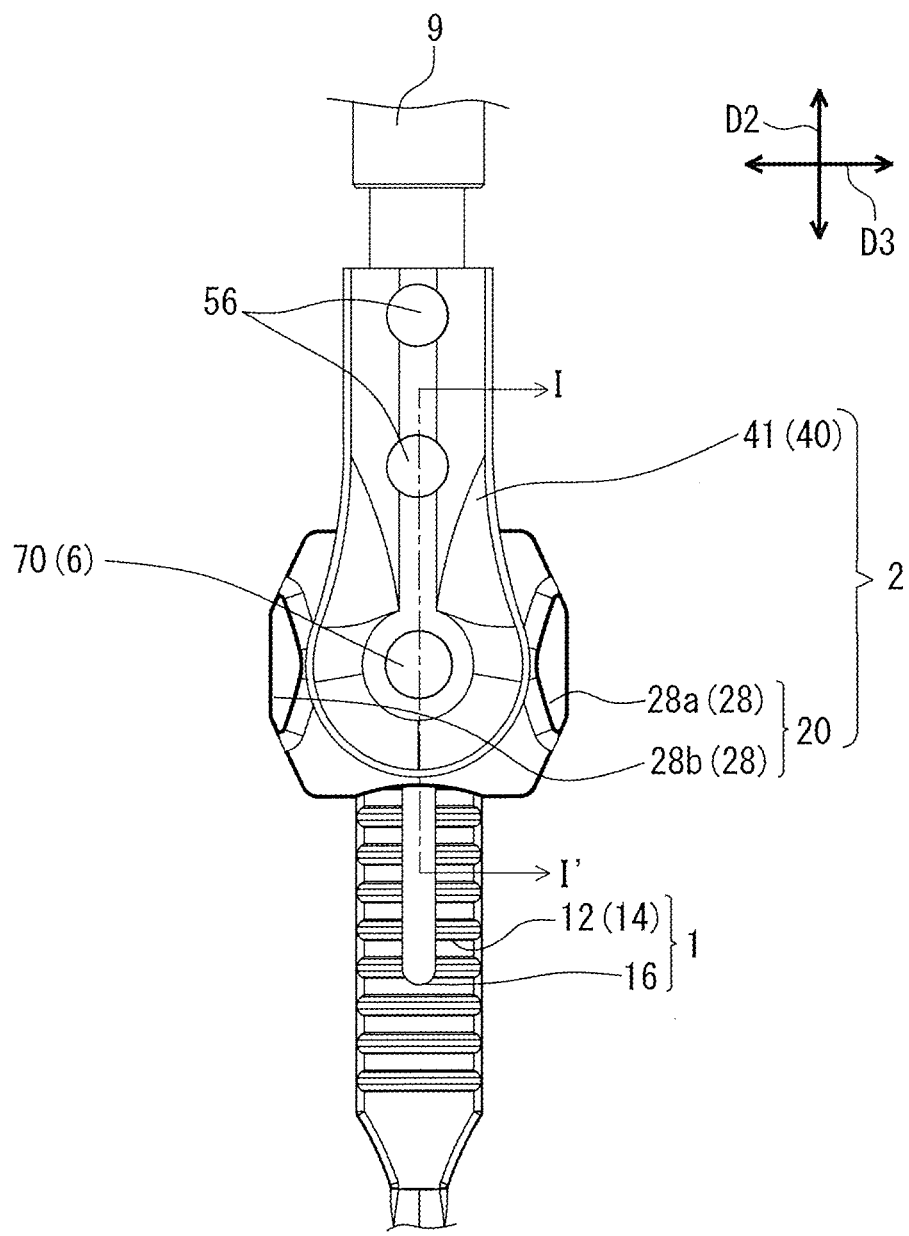
FIG. 6 shows a rear enlarged view of the adjustable machine handle assembly.
Figure 7:
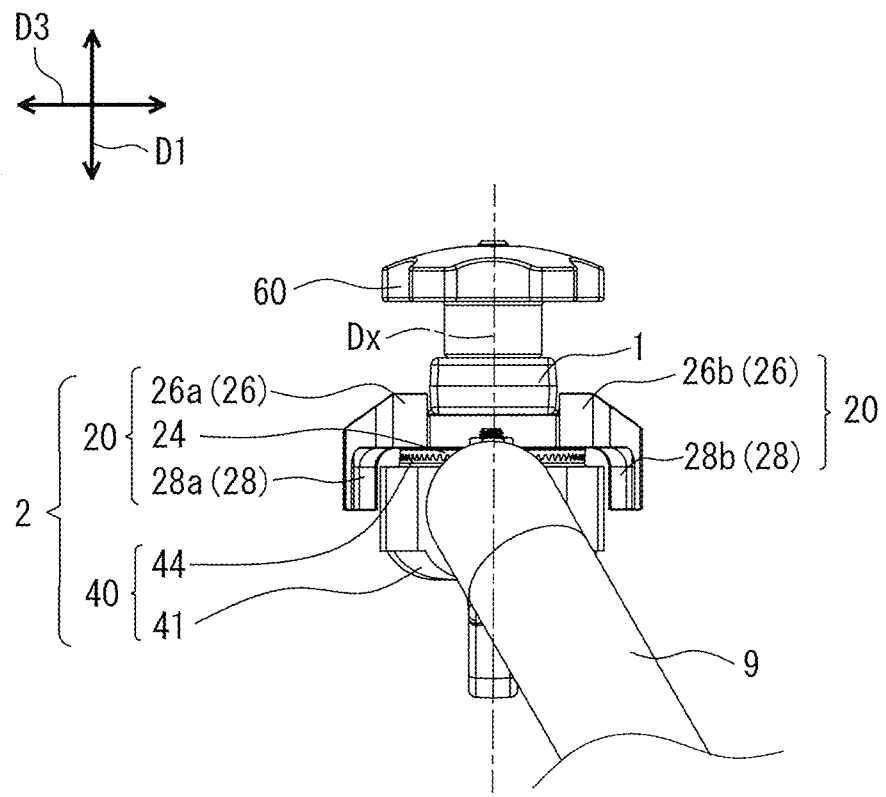
FIG. 7 shows a plan enlarged view of the adjustable machine handle assembly.
Figure 11:
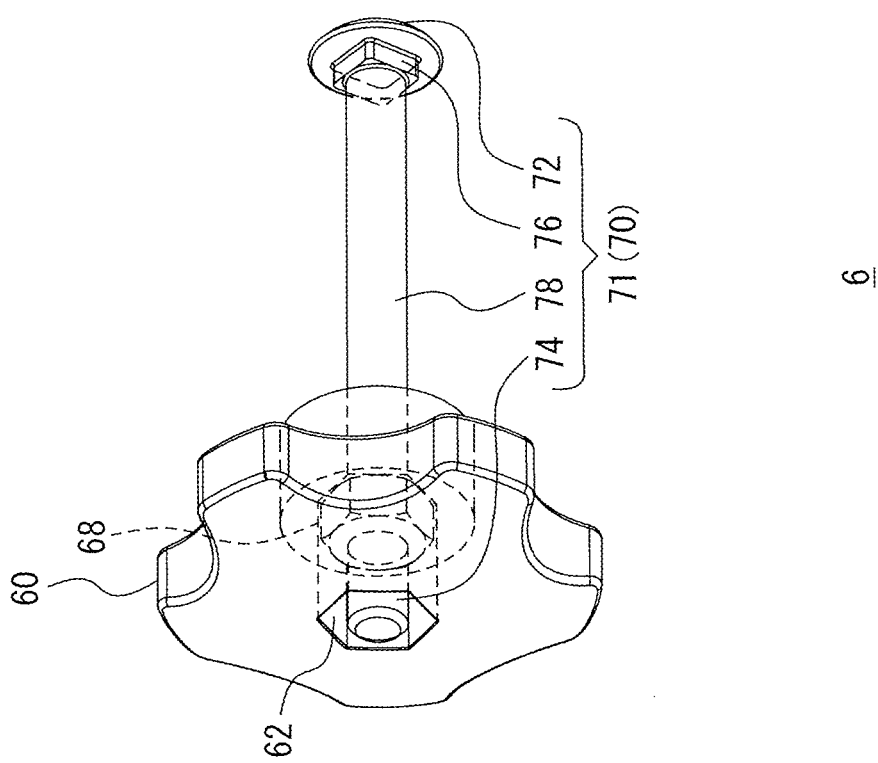
FIG. 11 shows a perspective view of the clamp.

As shown in FIG. 6, the support brace 1 further includes a slot 16 extending from the first side S1 to the second side S2 and elongated in the longitudinal direction D2. As shown in FIG. 11, the clamp 6 includes a knob 60 provided on the first side S1 of the support brace 1 and configured to tighten and loosen the clamp 6, and a rod 70 extending from the knob 60 to the handle holder 40 through the slot 16 and the engagement member 20. The rod 70 is, for example, a carriage bolt 71. The carriage bolt 71 includes a flanged head 72, a thread 74, a square neck 76, and a shank 78. The flanged head 72 is provided on the sixth side S6 of the handle holder 40. The thread 74 is provided opposite to the flanged head 72 and configured to be attached to the knob 60 via a nut 68. The knob 60 allows the user to operate the tool-less adjustment mechanism.

The knob 60 has a thread hole 62 into which the nut 68 fits. The square neck 76 is connected to the flanged head 72 between the flanged head 72 and the thread 74. The square neck 76 is smaller than the flanged head 72 as viewed in the side direction D1. The shank 78 connects the thread 74 and the square neck 76.

Figure 15:
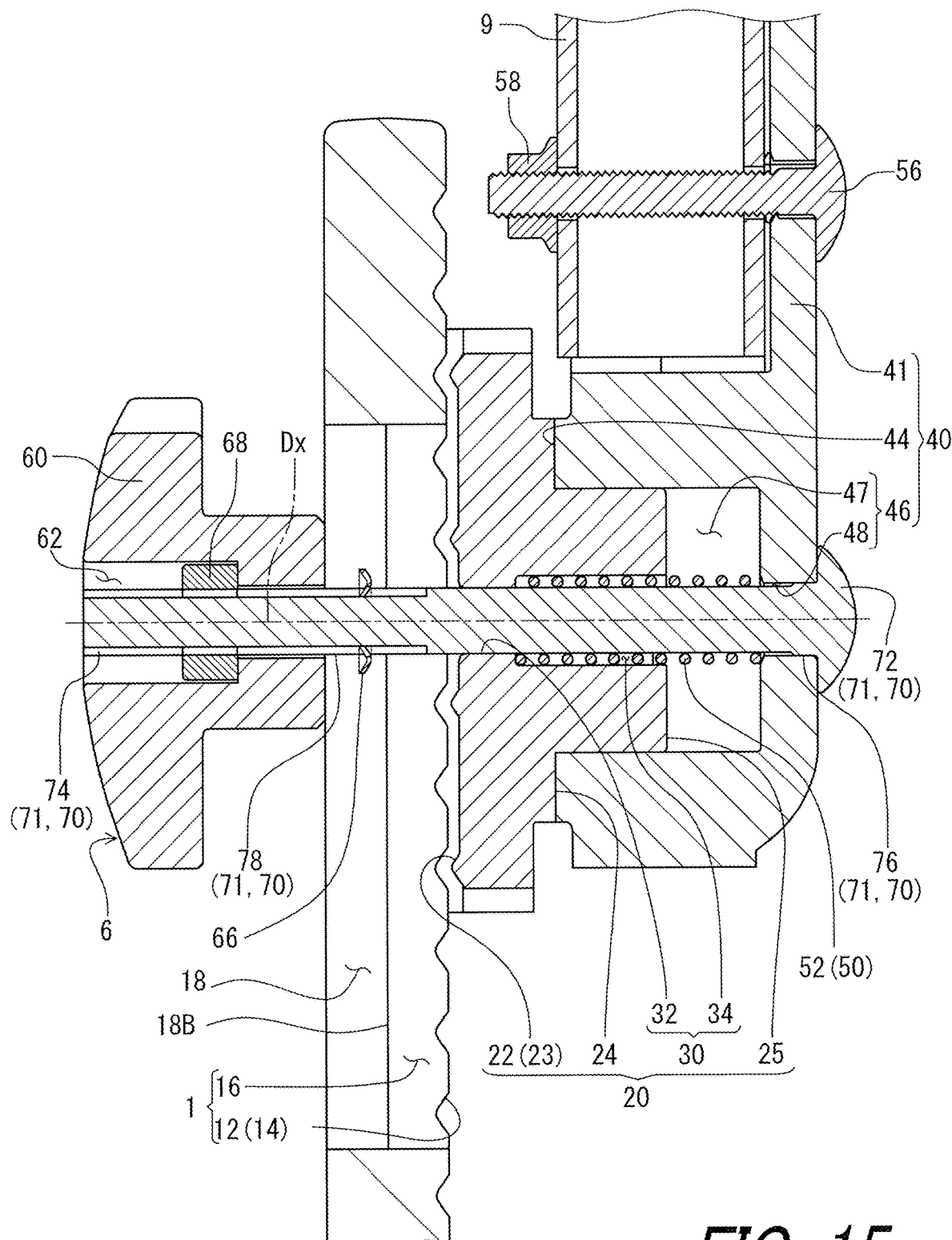
FIG. 15 shows a cross-sectional view taken along the cross-sectional line I-I' of FIG. 6 when the clamp is loosened and the engagement member is pulled to the handle holder.
Figure 16:
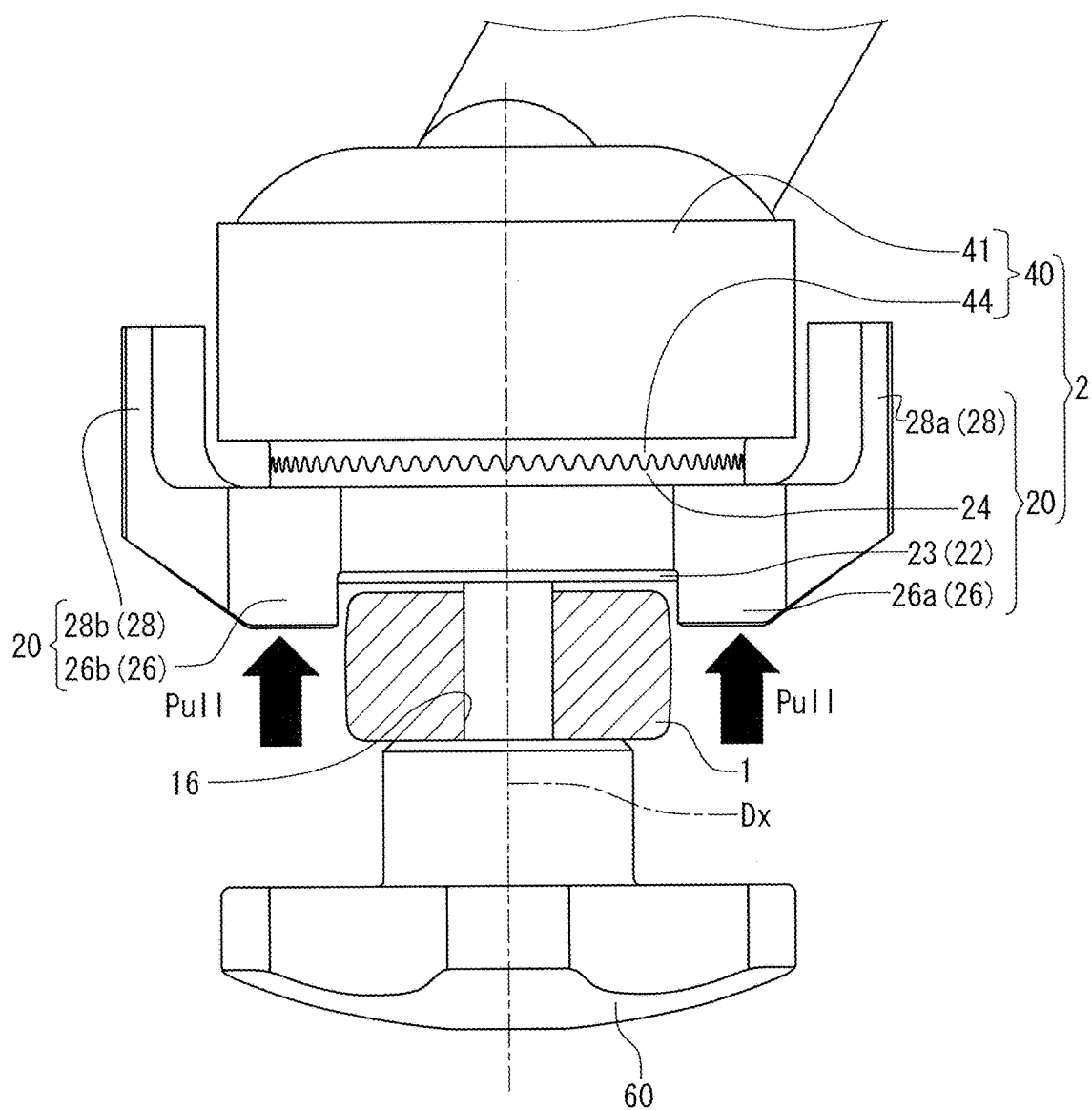
FIG. 16 shows a cross-sectional view taken along the cross-sectional line II-II' of FIG. 5 when the clamp is loosened and the engagement member is pulled to the handle holder.

As shown in FIG. 9, the engagement member 20 includes a boss 25 extending from the first positive clutch 24 in the side direction D1 and surrounded by the first positive clutch 24 as viewed in the side direction D1. The engagement member 20 has a first through hole 30 through which the rod 70 is configured to pass. The first through hole 30 includes a first portion 32 and a second portion 34 larger than the first portion 32 as viewed in the side direction D1. The engagement member 20 includes a first side surface 32S defining the first portion 32, a second side surface 34S defining the second portion 34, and a first bearing surface 36 connecting the first side surface 32S and the second side surface 34S. The boss 25 has the second portion 34. As shown in FIGS. 12, 13, and 15, the pressing member 50 is inserted into the second portion 34. The pressing member 50 is configured to press against the first bearing surface 36.

As shown in FIG. 10, the handle holder 40 has a second through hole 46 through which the rod 70 is configured to pass. The second through hole 46 includes a third portion 47 into which the boss 25 fits. The second through hole 46 further includes a fourth portion 48 into which the square neck 76 fits. The fourth portion 48 is smaller than the third portion 47 as viewed in the side direction D1. The handle holder 40 includes a third side surface 47S defining the third portion 47, fourth side surfaces 48S defining the fourth portion 48, and a second bearing surface 49 connecting the third side surface 47S and the fourth side surfaces 48S. The pressing member 50 is configured to press against the second bearing surface 49.

Since each of the boss 25 and the third portion 47 has a cylindrical shape that has a central axis Dx, the handle holder 40 is rotatably supported by the engagement member 20 and slidable on the engagement member 20 along the central axis Dx to maintain smooth rotational adjustment about the central axis Dx and to retain the pressing member 50. Furthermore, it prevents the moment arm from handle 9 from engaging the bottom teeth of first positive clutch 24 and the second positive clutch 44 while setting rotational adjustment. Since the square neck 76 fits into the fourth portion 48 and the nut 68 fits into the thread hole 62 of the knob 60, the nut 68 is rotated by rotating the knob 60 relative to the handle holder 40 and the support brace 1.

As shown in FIGS. 5, 7, 8, 16, and 18, the engagement member 20 further includes guide rails 28, more specifically 28a, 28b aligned on the third side S3 in the lateral direction D3 and extending in the longitudinal direction D2 such that the second engagement portion 22 is provided between the guide rails 28 in the lateral direction D3. The support brace 1 is provided between the guide rails 28 and configured to be guided by the guide rails 28 to be slidable in the longitudinal direction D2. The guide rails 28, the slot 16, and the rod 70 guides the movement of the engagement member 20 in the lateral direction D3.

Figure 17:
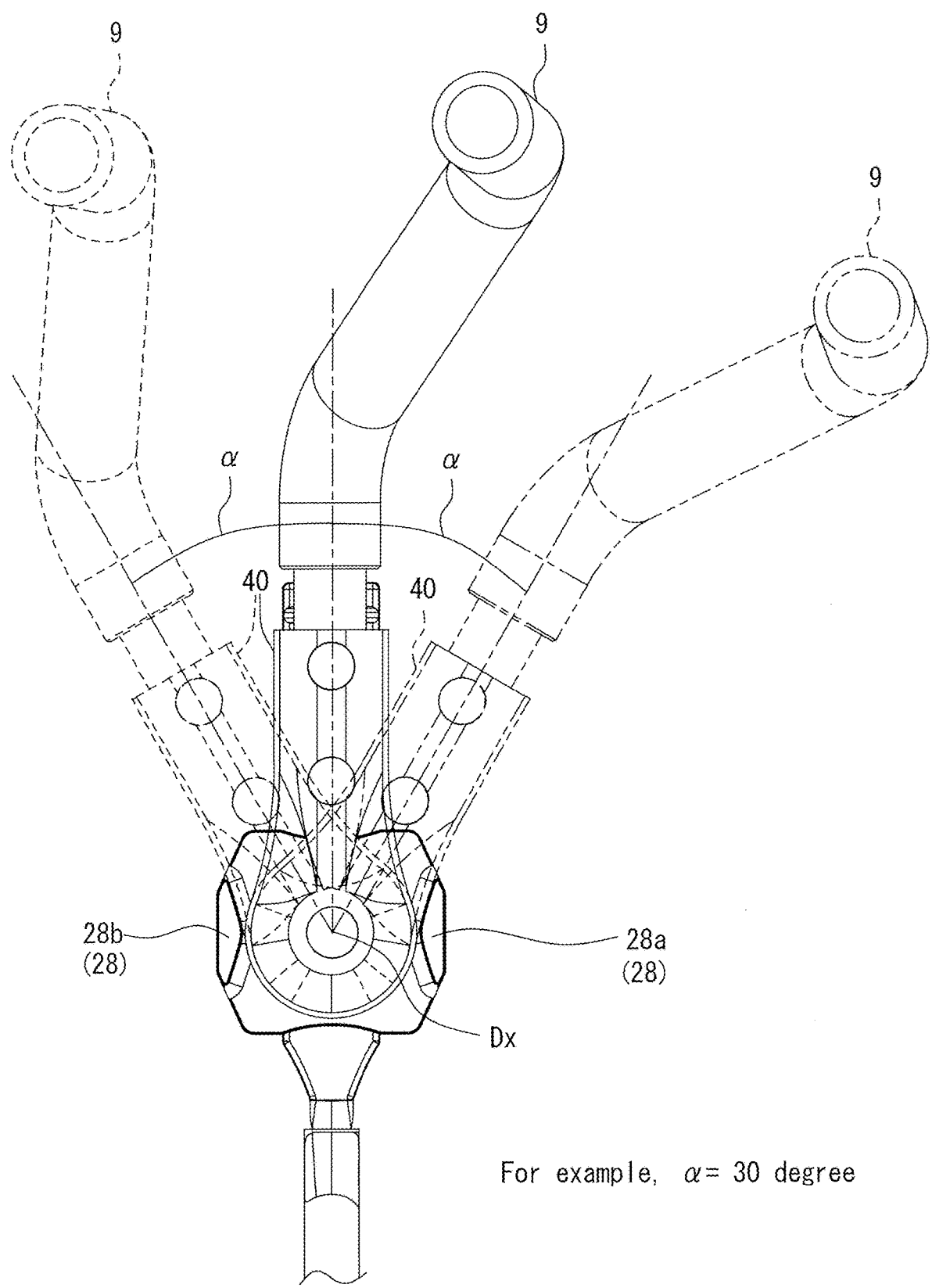
FIG. 17 shows various orientations of handle relative to the support brace wherein the solid line shows the handle 9 standing upright; the dotted line shows the handle inclined counterclockwise to the maximum amount; and the two-dot chain line shows the handle inclined clockwise to the maximum amount.

As shown in FIGS. 6, 9, and 17, the engagement member 20 further includes projections 26 (more specifically 26a, 26b) protruding from the guide rails 28 (more specifically 28a, 28b respectively) in the lateral direction D3. The projections 26 extend in the side direction D1 such that the first positive clutch 24 is provided between the projections 26 in the lateral direction D3. Since the projections 26 are provided as such, inclination of the handle holder 40 is limited to angle α as shown in FIG. 17. The angle α is, for example, 30 degrees.

As shown in FIGS. 12, 13, 15, and 19, the clamp 6 further includes a push nut 66 engageable with the thread 74 of the carriage bolt 71 and configured to abut against the support brace 1 when the pressing member 50 pushes the engagement member 20 against the support brace 1 due to removal of the knob 60 from the adjustable machine handle assembly 100. The support brace 1 further comprises a slot peripheral groove 18 provided on the first side S1 and surrounding the slot 16 to receive the push nut 66 engaged with the thread 74 of the carriage bolt 71. A bottom 18B of the slot peripheral groove 18 is configured to abut against the push nut 66 engaged with the thread 74 of the carriage bolt 71 when the knob 60 is removed from the adjustable machine handle assembly 100.

How to Use Rotational Adjustment

Rotate the knob 60 to loosen the clamp 6 until the first positive clutch 24 and the second positive clutch 44 are slightly past each other enough to allow rotational adjustment around the central axis Dx. The pressing member 50 is configured to push the engagement member 20 against the support brace 1 to engage the second engagement portion 22 with the first engagement portion 12 and to disengage the first positive clutch 24 from the second positive clutch 44 when the clamp 6 is loosened and the engagement member 20 is not pulled to the handle holder 40.

The first positive clutch 24 can be engaged with the second positive clutch 44 at rotational intervals. Teeth of each of the first positive clutch 24 and the second positive clutch 44 are spaced apart from each other by every rotational interval. In the example shown in FIGS. 1-18, teeth of each of the first positive clutch 24 and the second positive clutch 44 are spaced apart from each other by every 5 degrees. However, the rotational interval may be a different angle from 5 degrees.

How to Use Translational Adjustment

Rotate the knob 60 to loosen the clamp 6 and squeeze the engagement member 20 and the handle holder 40 to disengage the second engagement portion 22 from the first engagement portion 12 to allow translational adjustment in the longitudinal direction D2.

The second engagement portion 22 can be engaged with the first engagement portion 12 at translational intervals. The grooves 14 are arranged at translational intervals in the lateral direction D3. In the example shown in FIGS. 1-18, the translational interval is 1 centimeter. However, the translational interval may be a different interval from 1 cm.

This technology could be applied to mechanisms that need unlimited stepped/un-stepped rotational and translational adjustment. Some application areas could include: Scaffolding, CranesModular, Building, Conveyor Systems, Articulated Robot Arms, Automate, Storage and Retrieval Systems, Car Racks, Train Couplings, Airplane Seating, Adjustable Beds and Operating Tables, Medical Imaging Devices, Wheelchairs, Boat Anchoring Systems, Sail Adjustment Mechanisms, Camera Sliders/Rigs, Stage Rigging, Telescopic and Adjustable Seating, Satellite Deployment Mechanisms, Weapon Mounts, Adjustable Shelving Units, Telescoping Tables and Desks, Solar Panel Tracking Systems, Wind Turbine Adjustments, etc.

It should be noted that the exemplary embodiments depicted and described herein set forth the preferred embodiments of the present invention, and are not meant to limit the scope of the claims hereto in any way. Numerous modifications and variations of the present invention are possible in light of the above teachings. It is therefore to be understood that, within the scope of the appended claims, the invention may be practiced otherwise than as specifically described herein.

Advantageous Effects of the Embodiment

With the adjustable machine handle assembly 100 and the mower 200 according to the embodiment, the clamp 6 is configured to adjust a distance between the first side S1 of the support brace 1 and the sixth side S6 of the handle holder 40 in the side direction D1. The clamp 6 is configured to be tightened to fasten the handle holder 40 to the support brace 1 such that the first engagement portion 12 is engaged with the second engagement portion 22 and the first positive clutch 24 is engaged with the second positive clutch 44 to secure a position and an orientation of the handle 9 relative to the support brace 1. Accordingly, it is possible to easily arrange the position and the orientation of the handle 9 relative to the support brace 1.

The handle mounting assembly 2 further includes a pressing member 50 provided between the engagement member 20 and the handle holder 40 in the side direction D1 to push the engagement member 20 against the support brace 1 to engage the second engagement portion 22 with the first engagement portion 12 and to disengage the first positive clutch 24 from the second positive clutch 44 when the clamp 6 is loosened. Accordingly, it is possible for a user to easily adjust the orientation of the handle 9 relative to the support brace 1 when the pressing member 50 presses the engagement member 20 against the support brace 1. It is possible for a user to easily adjust the position of the handle 9 relative to the support brace 1 by pulling the engagement member 20 toward the handle holder 40.

The pressing member 50 includes a compression spring 52. Accordingly, it is possible to easily manufacture the pressing member 50.

The support brace 1 further includes a slot 16 extending from the first side S1 to the second side S2 and elongated in the longitudinal direction D2. The clamp 6 includes a knob 60 and a rod 70. The knob 60 is provided on the first side S1 of the support brace 1 and configured to tighten and loosen the clamp 6. The rod 70 extends from the knob 60 to the handle holder 40 through the slot 16 and the engagement member 20. Accordingly, it is possible to easily tighten and loosen the clamp 6 by rotating the knob 60.

The engagement member 20 has a first through hole 30 through which the rod 70 is configured to pass. The first through hole 30 includes the first portion 32 and the second portion 34 larger than the first portion 32 as viewed in the side direction D1. The pressing member 50 is inserted into the second portion 34. The engagement member 20 includes the first side surface 32S, the second side surface 34S, and the first bearing surface 36. The first side surface 32S defines the first portion 32. The second side surface 34S defines the second portion 34. The first bearing surface 36 connects the first side surface 32S and the second side surface 34S. The pressing member 50 is configured to press against the first bearing surface 36. Accordingly, it is possible to minimize a space that accommodates the rod 70 and the pressing member 50.

The engagement member 20 further includes the boss 25 extending from the first positive clutch 24 in the side direction D1 and surrounded by the first positive clutch 24 as viewed in the side direction D1. The boss 25 has the second portion 34. The handle holder 40 has the second through hole 46 through which the rod 70 is configured to pass. The second through hole 46 includes the third portion 47 into which the boss 25 fits. Accordingly, it is possible for the boss 25 to guide the handle holder 40 in the side direction D1.

The rod 70 includes the carriage bolt 71 including the flanged head 72, the thread 74, the square neck 76, and the shank 78. The flanged head 72 is provided on the sixth side S6 of the handle holder 40. The thread 74 is provided opposite to the flanged head 72 and configured to be attached to the knob 60 via the nut 68. The square neck 76 is connected to the flanged head 72 between the flanged head 72 and the thread 74. The square neck 76 is smaller than the flanged head 72 as viewed in the side direction D1. The shank 78 connects the thread 74 and the square neck 76. The second through hole 46 further includes the fourth portion 48 into which the square neck 76 fits. The fourth portion 48 is smaller than the third portion 47 as viewed in the side direction D1. The handle holder 40 includes the third side surface 47S, the fourth side surfaces 48S, and the second bearing surface 49. The third side surface 47S defines the third portion 47. The fourth side surfaces 48S define the fourth portion 48. The second bearing surface 49 connects the third side surface 47S and the fourth side surfaces 48S. Accordingly, it is possible for the fourth portion 48 to prevent the rod 70 from being rotated when the knob 60 is rotated.

The clamp 6 further includes a push nut 66 engageable with the thread 74 of the carriage bolt 71 and configured to abut against the support brace 1 when the pressing member 50 pushes the engagement member 20 against the support brace 1 due to removal of the knob 60 from the adjustable machine handle assembly 100. Accordingly, the push nut 66 can prevent the adjustable machine handle assembly 100 from being dismantled.

The support brace 1 further comprises a slot peripheral groove 18 provided on the first side S1 and surrounding the slot 16 to receive the push nut 66 engaged with the thread 74 of the carriage bolt 71. Accordingly, the slot peripheral groove 18 can prevent the push nut 66 from being strongly pressed by the knob 60 when the knob 60 is tightly screwed to the rod 70.

A bottom 18B of the slot peripheral groove 18 is configured to abut against the push nut 66 engaged with the thread 74 of the carriage bolt 71 when the knob 60 is removed from the adjustable machine handle assembly 100. Accordingly, the push nut 66 can prevent the adjustable machine handle assembly 100 from being dismantled.

Each of the boss 25 and the third portion 47 has a cylindrical shape that has a central axis Dx. The first positive clutch 24 and the second positive clutch 44 constitute a Hirth joint whose teeth extend in a radial direction with respect to the central axis Dx. Accordingly, it is possible to adjust the orientation of the handle 9 relative to the support brace 1 at an angle of 360 degrees divided by number of teeth of the Hirth joint.

The first engagement portion 12 includes grooves 14 provided on the second side S2 of the support brace 1 and aligned in the longitudinal direction D2. The second engagement portion 22 includes at least one tooth provided on the third side S3 of the engagement member 20 to be engageable with the grooves 14. Accordingly, it is possible to adjust the position of the handle 9 relative to the support brace 1 at an interval of the grooves 14.

Each of the grooves 14 extends in the lateral direction D3 and each of the at least one tooth extends in the lateral direction D3. Accordingly, it is possible to provide enough lengths of the grooves 14 and the at least one tooth to prevent the engagement member 20 from moving in the longitudinal direction D2 when each of the at least one tooth engages with the respective at least one groove.

The engagement member 20 further includes guide rails 28 aligned on the third side S3 in the lateral direction D3 and extending in the longitudinal direction D2 such that the second engagement portion 22 is provided between the guide rails 28 in the lateral direction D3. The support brace 1 is provided between the guide rails 28 and configured to be guided by the guide rails 28 to be slidable in the longitudinal direction D2. Accordingly, it is possible for the guide rails 28 to guide the support brace 1 in the longitudinal direction D2 and to prevent the support brace 1 from moving in the lateral direction D3.

The engagement member 20 further includes projections 26 protruding from the guide rails 28 respectively in the lateral direction D3. The projections 26 extend in the side direction D1 such that the first positive clutch 24 is provided between the projections 26 in the lateral direction D3. Accordingly, it alleviates pulling the engagement member 20 toward the handle holder 40.

The present application refers to words "include" and derivatives as nonrestrictive terms for description of provision of constituent elements, without exclusion of any other constituent element not referred to in the present application. The same applies to words "have", "provided with", and derivatives thereof.

Expressions "member", "part", "element", "body", and "structure" may have a plurality of meanings indicating a single portion and a plurality of portions.

Ordinal numbers "first", "second", and the like are terms for simple distinction among configurations, without having any other meaning (e.g. specific order). For example, provision of a "first element" does not indicate provision of a "second element", and provision of the "second element" does not indicate provision of the "first element".

Expressions "substantially", "approximately", "about", and the like indicating degrees may each have a rational deviation not significantly changing a final result. All the numerical values referred to in the present application may be interpreted as including any one of the expressions "substantially", "approximately", "about", and the like.

In the present application, an expression "at least one of A and B" is interpreted to encompass (1) only A, (2) only B, and (3) both A and B.

In view of the above disclosure, the present invention can obviously include various modifications and alterations. The present invention may thus be implemented in any manner different from those specifically disclosed in the present application without departing from the spirit of the preset invention.

REFERENCE NUMERALS IN THE DRAWINGS

1: support brace
10: attachment portion
12: first engagement portion
14: grooves
16: slot
18: slot peripheral groove
2: handle mounting assembly
20: engagement member
22: second engagement portion
23: teeth (at least one tooth)
24: first positive clutch
25: boss
26 (26a, 26b): guide rails
28 (28a, 28b): projections
30: first through hole
32: first portion
32S: first side surface
34: second portion
34S: second side surface
36: first bearing surface
40: handle holder
41: handle mounting portion
42: attachment hole
43: attachment hole
44: second positive clutch
46: second through hole
47: third portion
47S: third side surface
48: fourth portion
48S: fourth side surface
49: second bearing surface
50: pressing member
52: compression spring
56: attachment bolts
58: attachment nuts
6: clamp
60: knob
62: thread hole
66: push nut
68: nut
70: rod
71: carriage bolt
72: flanged head
74: thread
76: square neck
78: shank
9: handle
100: An adjustable machine handle assembly
200: mower
S1: first side
S2: second side
S3: third side
S4: fourth side
S5: fifth side
S6: sixth side
D1: side direction
D2: longitudinal direction
D3: lateral direction
Dx: central axis

What is claimed is:

1. An adjustable machine handle assembly comprising:
   a handle;
   a support brace configured to support the handle and having a first side and a second side opposite to the first side in a side direction, the support brace comprising a first engagement portion provided on the second side;
   a handle mounting assembly comprising:
      an engagement member having a third side opposite to the second side in the side direction and a fourth side opposite to the third side in the side direction, the engagement member comprising:
         a second engagement portion provided on the third side to be engageable with the first engagement portion at positions aligned in a longitudinal direction substantially perpendicular to the side direction; and
         a first positive clutch provided on the fourth side; and
      a handle holder configured to hold the handle and having a fifth side opposite to the fourth side in the side direction and a sixth side opposite to the fifth side in the side direction, the handle holder comprising:
a second positive clutch provided on the fifth side opposite to the first positive clutch in the side direction and configured to engage with the first positive clutch; and
a clamp configured to adjust a distance between the first side of the support brace and the sixth side of the handle holder in the side direction;
the clamp configured to be tightened to fasten the handle holder to the support brace such that the first engagement portion is engaged with the second engagement portion and the first positive clutch is engaged with the second positive clutch to secure a position and an orientation of the handle relative to the support brace; and
the clamp configured to be loosened to allow the engagement member to be separated from at least one of the support brace and the handle holder, the second positive clutch being disengaged from the first positive clutch to allow the orientation of the handle relative to the support brace to be changed when the engagement member is separated from the handle holder, the second engagement portion being disengaged from the first engagement portion in a lateral direction which is non-parallel to the longitudinal direction and substantially perpendicular to the side direction to allow the position of the handle relative to the support brace to be changed in the longitudinal direction when the engagement member is separated from the support brace.

2. The adjustable machine handle assembly according to claim 1, wherein
the handle mounting assembly further comprises a pressing member provided between the engagement member and the handle holder in the side direction to push the engagement member against the support brace to engage the second engagement portion with the first engagement portion and to disengage the first positive clutch from the second positive clutch when the clamp is loosened.

3. The adjustable machine handle assembly according to claim 2, wherein
the pressing member includes a compression spring.

4. The adjustable machine handle assembly according to claim 2,
wherein the support brace further comprises a slot extending from the first side to the second side and elongated in the longitudinal direction, and
wherein the clamp comprises
a knob provided on the first side of the support brace and configured to tighten and loosen the clamp; and
a rod extending from the knob to the handle holder through the slot and the engagement member.

5. The adjustable machine handle assembly according to claim 4,
wherein the engagement member has a first through hole through which the rod is configured to pass,
wherein the first through hole comprises a first portion and a second portion larger than the first portion as viewed in the side direction,
wherein the pressing member is inserted into the second portion, and
wherein the engagement member comprises
a first side surface defining the first portion;
a second side surface defining the second portion; and
a first bearing surface connecting the first side surface and the second side surface, the pressing member being configured to press against the first bearing surface.

6. The adjustable machine handle assembly according to claim 5,
wherein the engagement member further comprises a boss extending from the first positive clutch in the side direction and surrounded by the first positive clutch as viewed in the side direction,
wherein the boss has the second portion, and
wherein the handle holder has a second through hole through which the rod is configured to pass, the second through hole comprising a third portion into which the boss fits.

7. The adjustable machine handle assembly according to claim 6,
wherein the rod includes a carriage bolt comprising:
a flanged head provided on the sixth side of the handle holder;
a thread provided opposite to the flanged head and configured to be attached to the knob via a nut;
a square neck connected to the flanged head between the flanged head and the thread, the square neck being smaller than the flanged head as viewed in the side direction; and
a shank connecting the thread and the square neck,
wherein the second through hole further comprises a fourth portion into which the square neck fits, the fourth portion being smaller than the third portion as viewed in the side direction, and
wherein the handle holder comprises
a third side surface defining the third portion;
fourth side surfaces defining the fourth portion; and
a second bearing surface connecting the third side surface and the fourth side surfaces, the pressing member is configured to press against the second bearing surface.

8. The adjustable machine handle assembly according to claim 7,
wherein the clamp further comprises a push nut engageable with the thread of the carriage bolt and configured to abut against the support brace when the pressing member pushes the engagement member against the support brace due to removal of the knob from the adjustable machine handle assembly.

9. The adjustable machine handle assembly according to claim 8,
wherein the support brace further comprises a slot peripheral groove provided on the first side and surrounding the slot to receive the push nut engaged with the thread of the carriage bolt.

10. The adjustable machine handle assembly according to claim 9,
wherein a bottom of the slot peripheral groove is configured to abut against the push nut engaged with the thread of the carriage bolt when the knob is removed from the adjustable machine handle assembly.

11. The adjustable machine handle assembly according to claim 6,
wherein each of the boss and the third portion has a cylindrical shape that has a central axis, and
wherein the first positive clutch and the second positive clutch constitute a Hirth joint whose teeth extend in a radial direction with respect to the central axis.

12. The adjustable machine handle assembly according to claim 1, wherein the first engagement portion includes grooves provided on the second side of the support brace and aligned in the longitudinal direction, and wherein the second engagement portion includes at least one tooth provided on the third side of the engagement member to be engageable with the grooves.

13. The adjustable machine handle assembly according to claim 12, wherein each of the grooves extends in the lateral direction, and wherein each of the at least one tooth extends in the lateral direction.

14. The adjustable machine handle assembly according to claim 1, wherein the engagement member further comprises guide rails aligned on the third side in the lateral direction and extending in the longitudinal direction such that the second engagement portion is provided between the guide rails in the lateral direction, and wherein the support brace is provided between the guide rails and configured to be guided by the guide rails to be slidable in the longitudinal direction.

15. The adjustable machine handle assembly according to claim 14, wherein the engagement member further comprises projections protruding from the guide rails respectively in the lateral direction, and wherein the projections extend in the side direction such that the first positive clutch is provided between the projections in the lateral direction.

16. A mower comprising the adjustable machine handle assembly according to claim 1.

17. The adjustable machine handle assembly according to claim 3, wherein the support brace further comprises a slot extending from the first side to the second side and elongated in the longitudinal direction, and wherein the clamp comprises
a knob provided on the first side of the support brace and configured to tighten and loosen the clamp; and
a rod extending from the knob to the handle holder through the slot and the engagement member.

18. The adjustable machine handle assembly according to claim 17, wherein the engagement member has a first through hole through which the rod is configured to pass, wherein the first through hole comprises a first portion and a second portion larger than the first portion as viewed in the side direction, wherein the pressing member is inserted into the second portion, and wherein the engagement member comprises
a first side surface defining the first portion;
a second side surface defining the second portion; and
a first bearing surface connecting the first side surface and the second side surface, the pressing member being configured to press against the first bearing surface.

19. The adjustable machine handle assembly according to claim 18, wherein the engagement member further comprises a boss extending from the first positive clutch in the side direction and surrounded by the first positive clutch as viewed in the side direction, wherein the boss has the second portion, and wherein the handle holder has a second through hole through which the rod is configured to pass, the second through hole comprising a third portion into which the boss fits.

20. The adjustable machine handle assembly according to claim 19 wherein the rod includes a carriage bolt comprising:
a flanged head provided on the sixth side of the handle holder;
a thread provided opposite to the flanged head and configured to be attached to the knob via a nut;
a square neck connected to the flanged head between the flanged head and the thread, the square neck being smaller than the flanged head as viewed in the side direction; and
a shank connecting the thread and the square neck, wherein the second through hole further comprises a fourth portion into which the square neck fits, the fourth portion being smaller than the third portion as viewed in the side direction, and wherein the handle holder comprises
a third side surface defining the third portion;
fourth side surfaces defining the fourth portion; and
a second bearing surface connecting the third side surface and the fourth side surfaces, the pressing member is configured to press against the second bearing surface.

* * * * *